United States Patent
Mademba-Sy

(10) Patent No.: US 6,552,465 B2
(45) Date of Patent: Apr. 22, 2003

(54) ELECTRIC MOTOR EQUIPPED WITH MEANS OF AUTOMATICALLY UNLOCKING THE SUPPLY BRUSHES

(75) Inventor: Thierry Mademba-Sy, Conde-sur-Noireau (FR)

(73) Assignee: Meritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 09/948,118

(22) Filed: Sep. 6, 2001

(65) Prior Publication Data

US 2002/0047466 A1 Apr. 25, 2002

(30) Foreign Application Priority Data

Sep. 6, 2000 (FR) .......................................... 00 11363

(51) Int. Cl.[7] .............................................. H02K 13/00
(52) U.S. Cl. ...................................................... 310/239
(58) Field of Search ................................. 310/236, 239, 310/240, 241, 242

(56) References Cited

U.S. PATENT DOCUMENTS

| 3,739,205 A | | 6/1973 | Winkelmann | |
| 5,495,134 A | * | 2/1996 | Rosenblum | 310/239 |
| 6,031,313 A | * | 2/2000 | Sugai et al. | 310/239 |

FOREIGN PATENT DOCUMENTS

| DE | 37 31 409 A | 4/1989 |
| EP | 0 282 377 A | 9/1988 |
| FR | 2 159 238 A | 6/1973 |
| FR | 2 726 700 A | 5/1996 |

OTHER PUBLICATIONS

French Search Report dated May 30, 2001.

* cited by examiner

Primary Examiner—Nestor Ramirez
Assistant Examiner—Nguyen Hanh
(74) Attorney, Agent, or Firm—Carlson, Gaskey & Olds P.C.

(57) ABSTRACT

An electric motor comprising a coiled rotor whose windings are energized by way of a commutator, a stator comprising a cylindrical shell in which is disposed a brush-carrying ring and an end flange fixed to the shell, the ring supporting two electrical supply brushes each associated with an elastic pressure member, each of the brushes and the respective elastic member being displaceable between a standby position, prior to the complete assemblage of the motor, in which the brush is separated from the commutator, and a working position, in which the brush bears on the commutator and the elastic member exerts a radial force on the brush directed towards the commutator. The flange comprises a projecting member corresponding to each brush, adapted so as to displace the brush and the respective elastic member from their standby position to their working position, when assembling the flange onto the shell.

14 Claims, 5 Drawing Sheets

ELECTRIC MOTOR EQUIPPED WITH MEANS OF AUTOMATICALLY UNLOCKING THE SUPPLY BRUSHES

BACKGROUND OF THE INVENTION

The present invention relates to an electric motor, in particular to a DC motor.

The state of the art already discloses a certain number of electric motors comprising a coiled rotor whose windings are energized by way of a commutator, a stator comprising a cylindrical shell in which is disposed a brush-carrying ring in the vicinity of an end of the said shell, and an end flange fixed to the said end of the shell, the said flange being provided with a roller bearing receiving the rotor, the said ring supporting two electrical supply brushes each associated with an elastic pressure member, each of the brushes and the respective elastic member being displaceable between a standby position, prior to the complete assemblage of the motor, in which the brush is separated from the commutator, and a working position, in which the brush, via a contact face, bears on the commutator and the elastic member exerts a radial force on a supporting face of the brush, which face is opposite to the contact face tending to press the said brush onto the commutator.

However, these motors exhibit a certain number of drawbacks, especially when assembling the various components constituting the motor.

Specifically, the brushes must be placed in their working position, where they are pressed against the commutator, only when the assemblage phase is complete, so that the ring can be arranged around the commutator without the brushes rubbing on it. To do this, they are locked in a temporary manner in their standby position, then unlocked and placed in their working position when assemblage of the motor is complete.

The operation of displacing the brushes from their standby position to their working position requires the use of specific machines intended to apply, across the shell, an unlocking pressure on the brushes, or the prior installation of a ring for retaining the brushes in their standby position, this ring being removed when the mounting operation is complete.

These arrangements provided for on known electric motors are not entirely satisfactory on account of the cost of the unlocking machines, or of the cost of manufacturing the specially provided components for effecting the temporary locking of the brushes, and owing to the additional operation time which this represents.

SUMMARY OF THE INVENTION

In order to remedy the aforesaid drawbacks, the subject of the invention is an electric motor of the aforesaid type whose end flange comprises a projecting member corresponding to each brush, adapted so as to bear on the brush and displace the said brush and the respective elastic member from their standby position to their working position, when assembling the end flange onto the shell.

By virtue of this arrangement, the unlocking of the brushes and their movement from their standby position to their working position is achieved automatically when assemblage of the motor is complete, that is to say when the end flange is mounted on the shell.

This operation is achieved without additional tooling, with no additional component, and also without any operation time being added to the motor assemblage time.

According to other characteristics of the invention:

the assembling of the flange onto the shell is carried out by at least one axial relative motion, and the projecting member is an axial finger having a ramp intended to bear on an edge of the corresponding brush, and adapted so that the axial motion of assembling the flange causes a radial motion of the brush to its working position;

the assembling of the flange onto the shell is carried out by at least one rotary relative motion, and the projecting member is an axial finger having a ramp intended to bear on an edge of the corresponding brush, and adapted so that the rotary motion of assembling the flange causes a radial motion of the brush to its working position;

the flange is fixed onto the shell by means of a bayonet device;

the elastic member is a spiral spring comprising an end arm which, in the standby position, is axially disengaged from the supporting face and axially prestressed, so as to move axially into its working position upon the radial displacement of the brush;

the end arm bears, in the standby position, on a substantially radial face of the brush; and the brush comprises a notch on its supporting face, said notch being adapted to be engaged by the end arm and retain said end arm, when the elastic member and the brush are in their working position.

The invention is also aimed at a drive device for motor vehicle equipment, comprising an electric motor as described above.

BRIEF DESCRIPTION OF THE DRAWINGS

Exemplary embodiments of the invention will now be described in conjunction with the appended drawings, in which.

DETAILED DESCRIPTION OF THE PREFERRED EMBODIMENT

Figure 1:
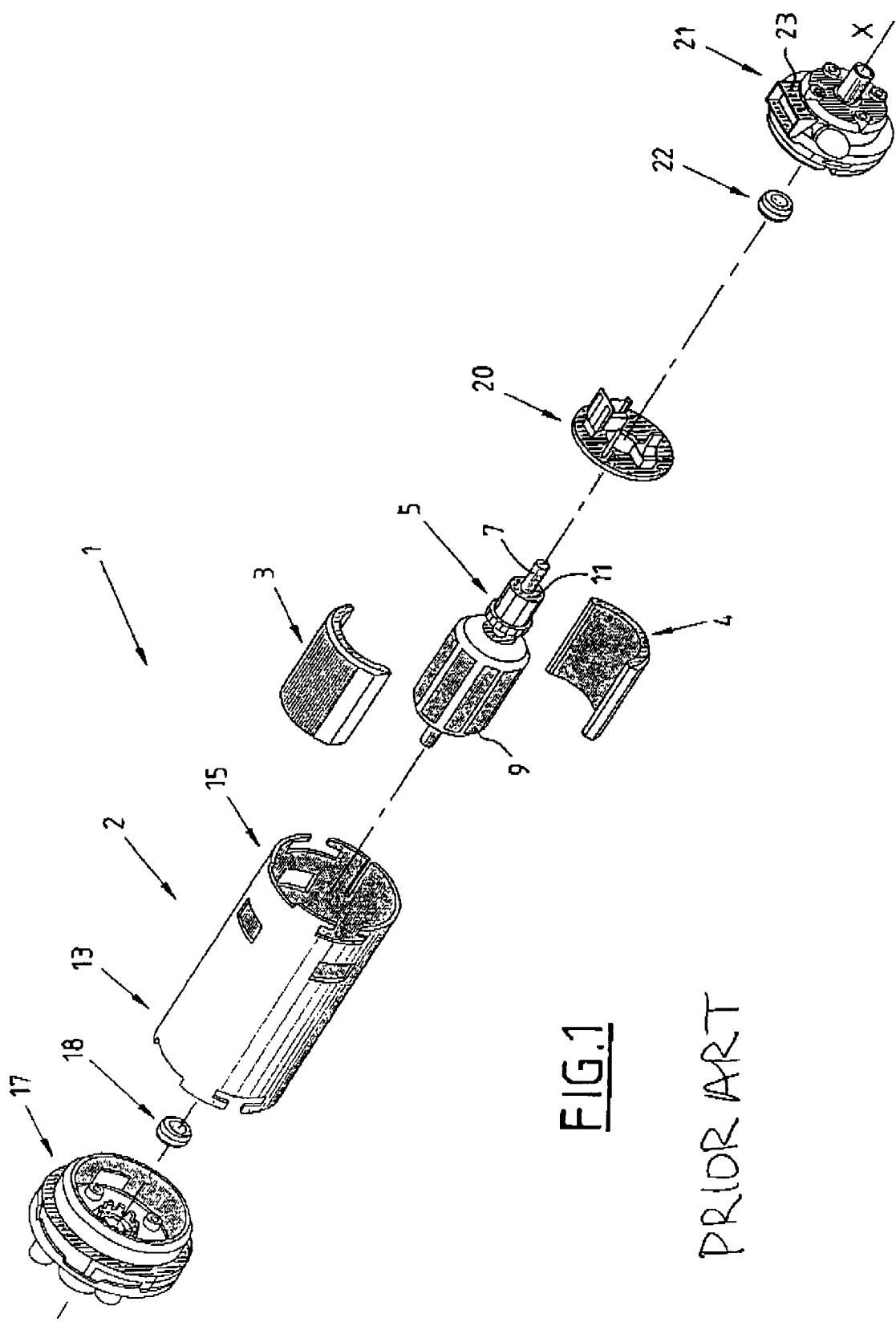
FIG. 1 is an exploded perspective view of an electric motor of known type.

FIG. 1 depicts the general structure of a DC electric motor.

This motor 1 comprises a shell 2 in which are arranged permanent magnets 3 and 4, and a rotor 5.

The rotor 5 consists in particular of a shaft 7 of axis X—X having armature windings 9 electrically energized by way of a commutator 11.

The shell 2 is of cylindrical shape with circular cross section, with the same axis X—X as the rotor shaft 7, and has two open ends 13, 15.

The rear end 13 of the shell 2 is adapted to receive a rear flange 17 fitted with a guidance bearing 18 for the rotor shaft 7.

The front end 15 of this shell 2 is for its part adapted to receive a brush-carrying ring 20, and a front flange 21 also fitted with a guidance bearing 22 for the rotor shaft 7.

The front flange 21 supports an electrical supply connector 23 and can also be designed to receive sensors or electronic cards for controlling the motor.

An electric motor according to the invention will now be described with reference to FIG. 2, by further detailing the front end part of the shell, the brush-carrying ring and the front flange, the other constituents described with reference to FIG. 1 not being directly relevant to the invention and it being possible to choose them, in order to carry out the invention, to be identical to those known in the state of the art.

A motor according to the invention comprises a shell 30, of which only an end piece corresponding to the front end 15 of the motor of the state of the art and represented in FIG. 1 has been represented. This shell 30 is of cylindrical shape with axis X—X, and of annular cross section. It has, emerging on its free end 32, an L-shaped aperture 34, one branch of which is axial and emerges on the free end 32. In the vicinity of the aperture 34, the shell 30 comprises a window 36.

A second aperture 34, symmetric with the first according to an axial symmetry with axis X—X, is formed in the shell 30.

A brush-carrying ring 40 is intended to be fixed in the shell 30 by fixing means (not represented). The brush-carrying ring 40 is formed of an annulus 42 of complementary section to that of the shell 30, the annulus 42 supporting on one of its faces two diametrically opposed studs 44. Each stud 44 exhibits the general shape of a parallelepiped in which a radially oriented likewise parallelepipedal channel 46 is formed. Each stud 44 moreover exhibits a projection in the form of a radial tooth 47, of which one face 47A (referenced in FIGS. 3A, 3B, 5A and 5B) is inclined by flaring out from the exit of the channel 46, on the opposite side to the surface of the annulus 42. The central hole 48 of the annulus 42 is intended to receive the commutator 11 of the rotor 5, in such a way that the channels 46 emerge on the peripheral surface of the commutator 11 when the motor is assembled. Each channel 46 receives a complementary brush 50 which is intended to bear on the commutator 11 via a contact face 50A (referenced in FIGS. 3A, 3B, 5A and 5B). A supporting face 50B of the brush 50, consisting of a face opposite the contact face 50A, has a notch 51 extending along a peripheral direction.

The arm 50 is associated with an elastic pressure member 52 secured to the annulus 42 by way of a respective fixing pin 54 formed as one component with the annulus 42. The elastic pressure member 52 is a spiral spring wound around the pin 54, and comprises a free end arm 52A intended to bear either on a radial face 55 (referenced in FIGS. 3A, 3B, 5A and 5B) of the brush 50, situated opposite the inclined face 47A of the tooth 47, or on its supporting face 50B while cooperating with the notch 51.

Figure 2:
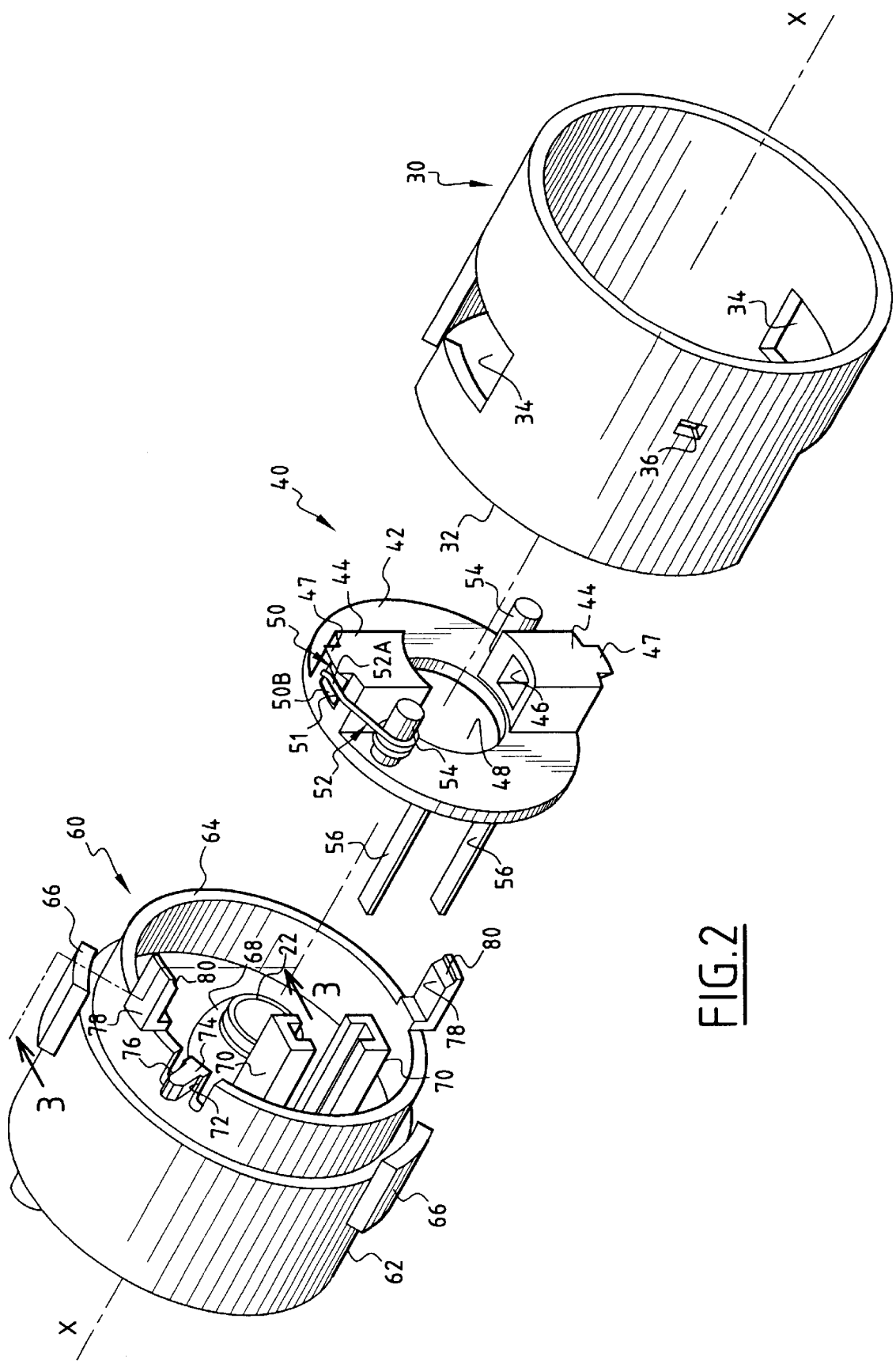
FIG. 2 is a partial exploded perspective view of an electric motor according to a first embodiment of the invention.

In FIG. 2, just one of the brushes 50 and just one of the elastic pressure members 52 have been represented. The annulus 42 also supports electrical connection strips 56 formed on the opposite face of the annulus 42 with respect to the stud 44, and also constituting guidance members.

The other electrical linking members associated with the brushes 50 have not been represented since conventional arrangements are involved.

Finally, a front flange 60 intended to be fixed onto the shell 30 has been represented in FIG. 2.

The front flange 60 has two coaxial cylindrical sleeves, the first 62 constituting an outer sleeve and the second 64 constituting an inner sleeve.

The outer sleeve 62 has two diametrically opposed locking pins 66 projecting axially from the side turned towards the shell 30, these pins being of complementary shape to those of the apertures 34 so as to cooperate with them.

The flange 60 comprises a hub 68 in which is mounted a bearing 22 such as described with reference to FIG. 1, intended to rotatably receive the shaft 7 of the rotor 5.

Guidance rails 70 complementary to the strips 56 project axially from the bottom of the front flange 60 and are secured to female electrical connection members (not represented) intended to electrically energize the brushes 50 by way of the connection strips 56.

In the inner sleeve 64 is formed an axial flexible tab 72 whose free end 74 is turned towards the shell 30 and comprises a radial lug 76 intended to be inserted into the window 36 of the shell 30 after elastic deformation of the flexible tab 72, in the position of complete insertion of the locking pin 66 in the aperture 34.

The male locking members formed by the locking pins 66 and the lug 76, and the respective complementary female members formed by the apertures 34 and window 36, constitute a bayonet-type fixing assembly, in which the fixing of the front flange onto the shell 30 is achieved by axial engagement of the locking pins 66 into the apertures 34, then by relative rotation as far as the position of abutment of the locking pins 66 at the bottom of the apertures 34, this position being locked by the cooperation of the lug 76 with the window 36.

Two diametrically opposed axially projecting members 78 are formed as one component with the inner sleeve 64 and are turned towards the brush-carrying ring 40. On the brush-carrying ring 40 side, these projecting members 78, which are intended to cooperate with the respective brushes 50, have a free end provided with a ramp 80 inclined with respect to the axis of insertion of the pins 66 into the apertures 34, while being turned towards the brush-carrying ring 40. The ramp 80 is thus adapted so that the motion of axial insertion of the flange 60 with respect to the shell 30 actuates the brushes 50 in radial translation towards the axis X—X.

The mounting of the flange 60 onto the shell 30 and the placing of the brushes 50 in the working position will now be described, with reference to FIGS. 3A and 3B.

Figure 3A:
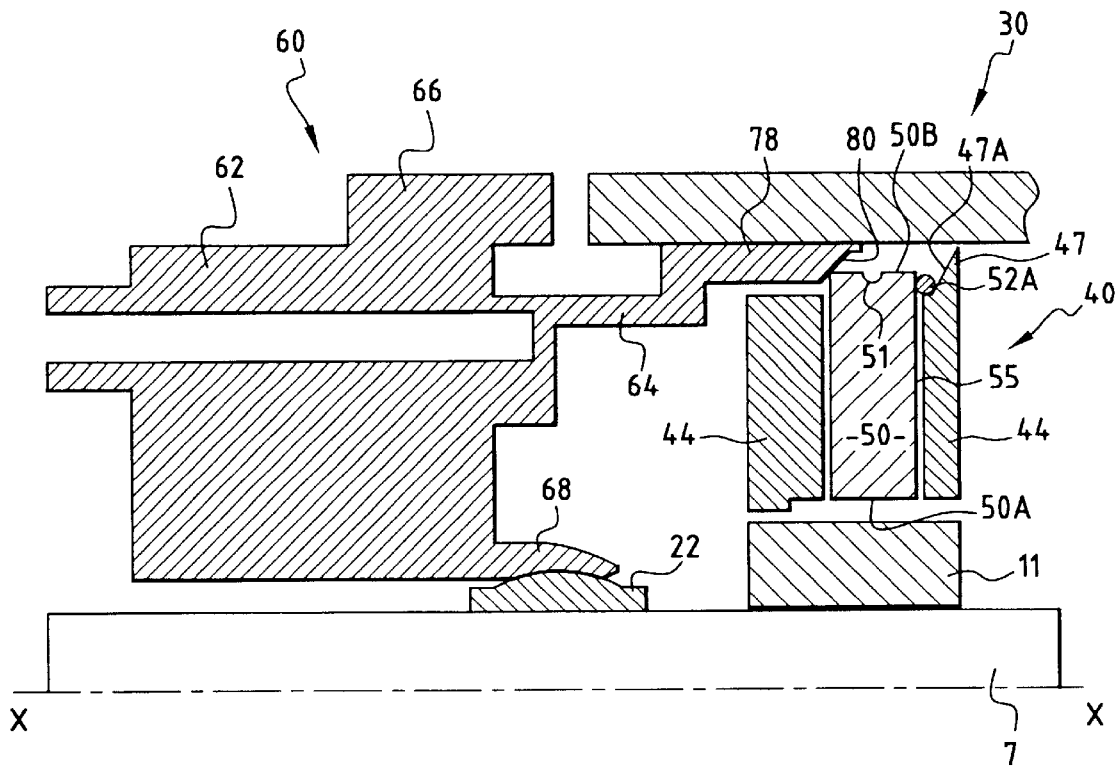
FIGS. 3A and 3B are half-sectional views along the line 3—3 of the assembly represented in FIG. 2, according to the first embodiment of the invention, respectively in the pre-assembled position and in the position of complete assemblage of the end flange onto the shell.

Represented in FIG. 3A is the assembly formed by the shell 30, the brush-carrying ring 40 and the front flange 60 in the pre-assembled position, that is to say prior to the insertion of the locking pin 66 into the aperture 34. In this position, the brushes 50 are in the standby position separated radially from the axis X—X, allowing the mounting of the ring 40 onto the rotor shaft 7 and the suitable positioning of the said ring 40 around the commutator 11. The brushes 50 are maintained in this position by conventional mechanical catches (not represented) providing a small retaining force. The end arm 52A of the elastic pressure member 52 is axially separated from its rest position so as to be prestressed between the inclined face 47A of the tooth 47 and the radial face 55 of the brush 50 placed opposite.

When the locking pin 66 is inserted into the aperture 34, the relative axial motion of the flange 60 with respect to the shell 30 gives rise to a supporting of the ramp 80 of the projecting member 78 on a ridge of the brush 50, and thus its radial displacement towards the axis X—X and the commutator 11. The end arm 52A of the elastic pressure member 52 is then disengaged from that face 55 of the brush 50 on which it bore, so that the said arm 52A takes up an axial position free of axial stress, this position corresponding to the engaging of the arm 52A in the notch 51 of the brush. The elastic pressure member 52 then provides a solely radial force on the brush 50, this force being greater than the retaining force provided by the mechanical catch for maintaining the brush in the standby position, so that the brush 50 is pressed onto the commutator 11 in its final working position.

Figure 3B:
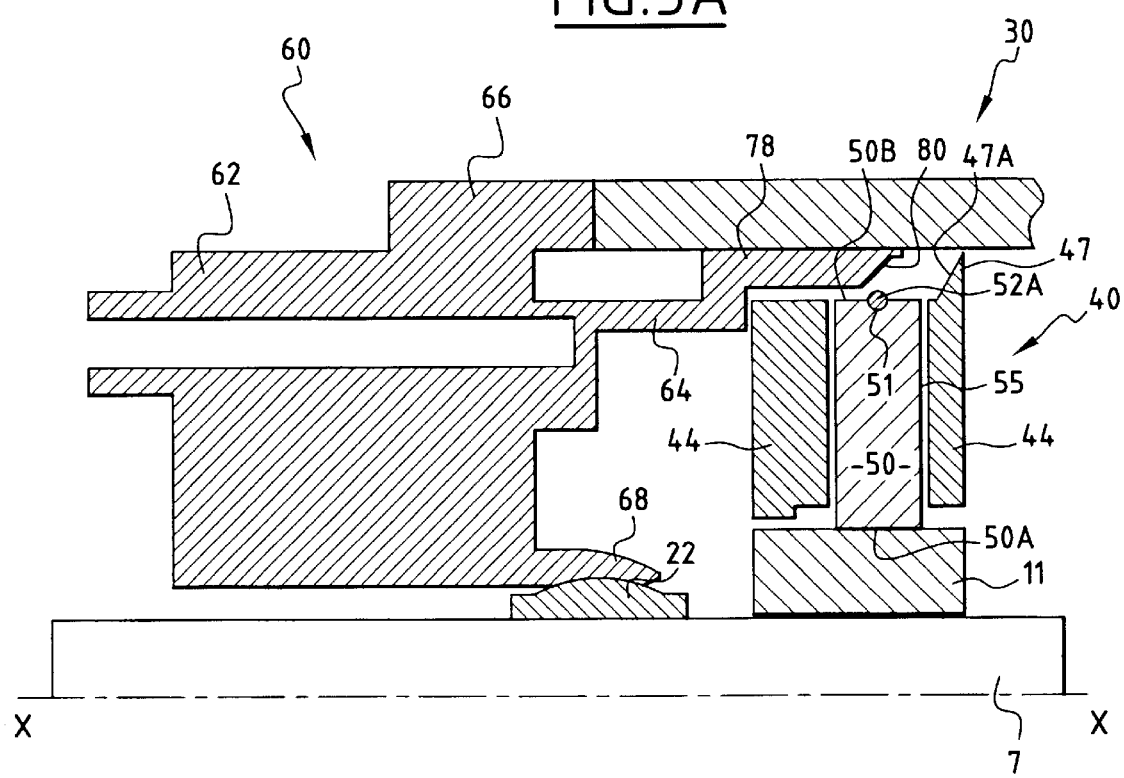

This working position has been represented in FIG. 3B.

Figure 4:
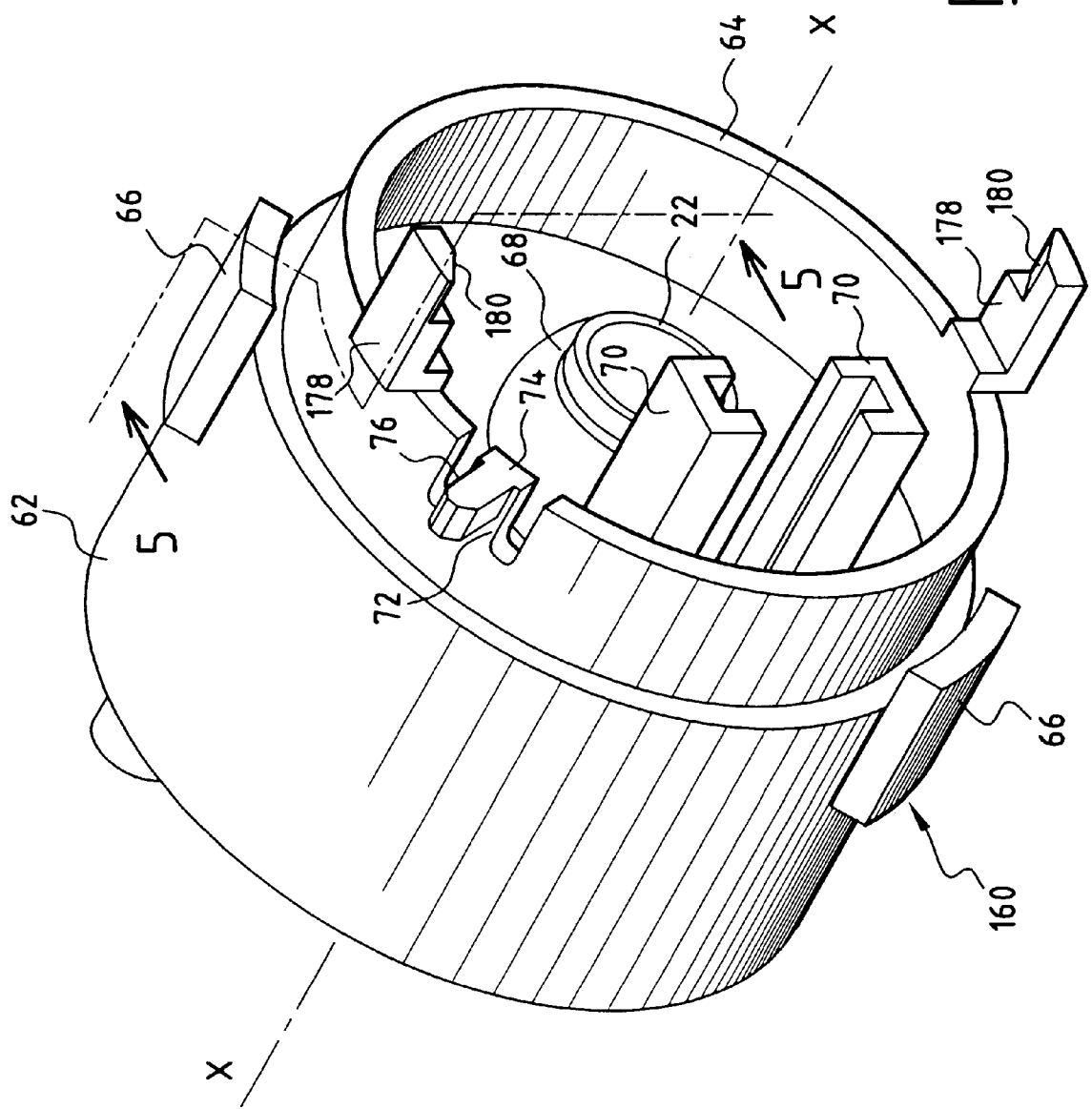
FIG. 4 is a perspective view on a larger scale, of an end flange alone, according to a second embodiment of the invention.

Represented, alone, in FIG. 4 is a front flange 160 comprising a projecting member 178 whose function is similar to that described with reference to FIGS. 2, 3A and 3B, with the sole difference that it comprises a ramp 180 inclined with respect to a plane tangential to a fictitious cylinder of circular cross section and of axis X—X, the inclination being defined by a rotation about the axis defined by the points of tangency. Therefore, it is the rotary motion of assemblage of the flange 160 with respect to the shell 30 which generates, by the supporting of the ramp 180 on a ridge of the brush 50, the radial displacement of the brush 50 towards its working position by support on the commutator 11.

Figure 5A:
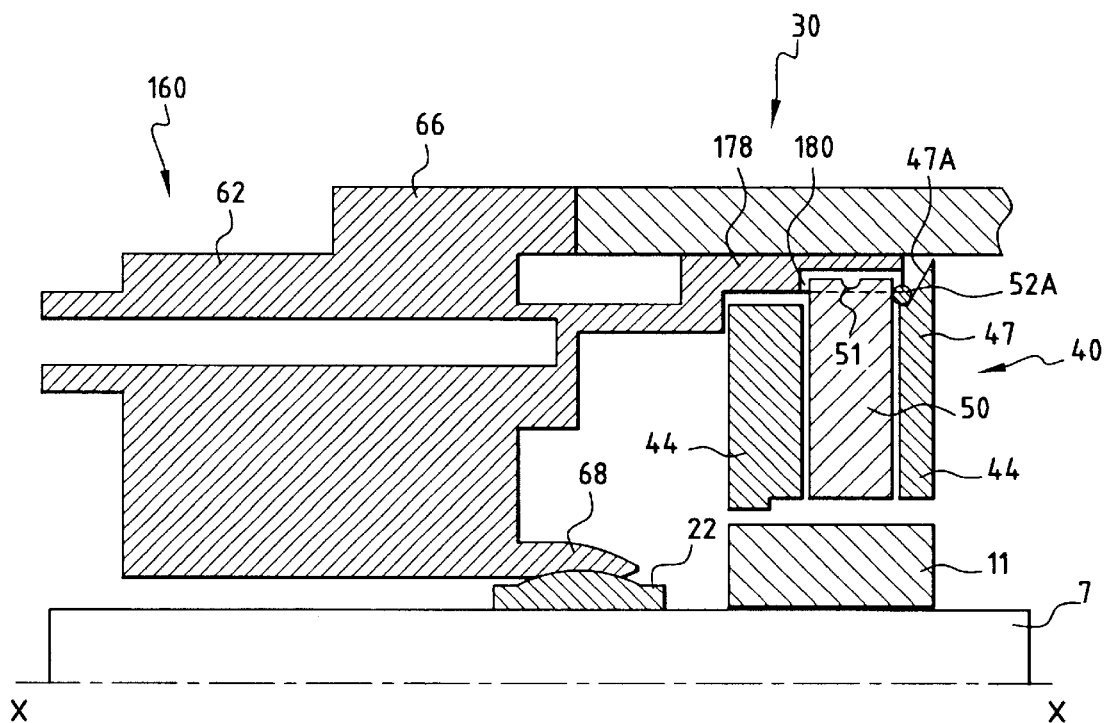
FIGS. 5A and 5B are half-sectional views along the line 5—5 indicated in FIG. 4, which are similar to FIGS. 3A and 3B.
Figure 5B:
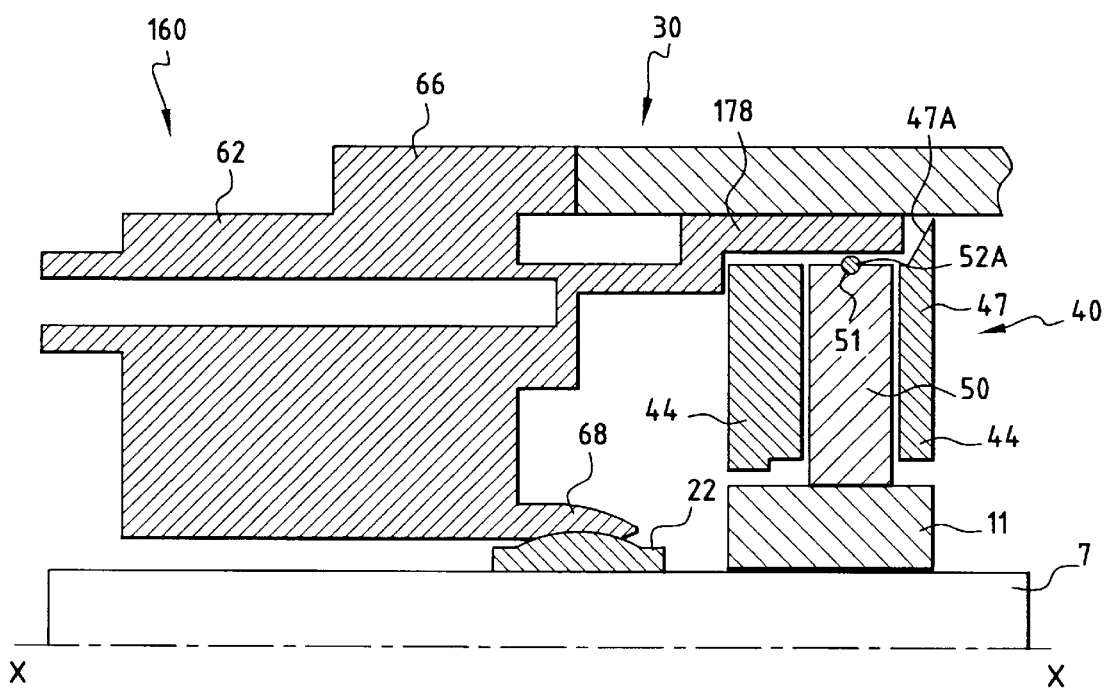

The shell 30 and the flange 160 are represented in FIG. 5A in the pre-assemblage position, in which only the axial insertion has been carried out, whilst FIG. 5B illustrates the final relative position of these same components and of the brush-carrying ring 40, when the relative rotational motion is complete.

The invention just described in these two embodiments also makes it possible to achieve the movement of the brushes from their standby position to their working position without an additional operation with respect to the assembling of the motor and without resorting to an additional mechanical component dedicated solely to placing the brushes in position.

This results in substantially reduced time and cost of manufacture and/or of assemblage, for motors of the type aimed at by the invention.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An electric motor comprising:
a coiled rotor including windings energized by a commutator, a stator including a cylindrical shell in which is disposed a brush-carrying ring proximate to one of a pair of ends of the said shell, and an end flange fixed to said one end of the shell, said flange being provided with a roller bearing receiving the rotor, said ring supporting a pair of electrical supply brushes each associated with an elastic pressure member, each of the brushes and the respective elastic member being displaceable between a standby position, prior to the complete assemblage of the motor, in which the brush is separated from the commutator, and a working position, in which the brush, via a contact face, bears on the commutator, and the elastic member exerts a radial force on a supporting face of the brush, the supporting face being opposite to to contact face tending to press said brush onto the commutator, wherein the end flange includes a projecting member corresponding to each of said pair of brushes, adapted so as to bear on the brush and displace the brush and the respective elastic member from the standby position to the working position when assembling the end flange onto the shell, and assembly of the flange onto the shell is carried out by at least one axial relative motion, and the projecting member is an axial finger having a ramp intended to bear on an edge of the corresponding brush, and adapted so that the axial motion of assembling the flange causes a radial motion of the brush to said working position, and the elastic member is a spiral spring including an end arm which, in said standby position, is axially disengaged front the supporting face and axially prestressed, so as to move axially into said working position upon radial displacement of the brush.

2. The electric motor according to claim 1, wherein the flange is fixed onto the shell by a bayonet device.

3. The electric motor according to claim 1, wherein assembly of the flange onto the shell is carried out by at least one rotary relative motion, and the projecting member is an axial finger having a ramp intended to bear on an edge of the corresponding brush, and adapted so that the rotary motion of assembling the flange causes a radial motion of the brush to said working position.

4. The electric motor according to claim 3, wherein the flange is fixed onto the shell by a bayonet device.

5. The electric motor according to claim 1, wherein the end arm bears, in the standby position, on a substantially radial face of the brush.

6. The electric motor according to claim 1, wherein the brush comprises a notch on said supporting face, said notch being adapted to be engaged by the end arm and retain said end arm, when the elastic member and the brush are in said working position.

7. The electric motor as recited in claim 1, wherein said elastic pressure member is a spiral spring wound around a pin.

8. A drive device for a motor vehicle equipment comprising:
an electric motor including a coiled rotor including windings energized by a commutator, a stator including a cylindrical shell in which is disposed a brush-carrying ring proximate to one of a pair of ends of the said shell, and an end flange fixed to said one end of the shell, said flange being provided with a roller bearing receiving the rotor, said ring supporting a pair of electrical supply brushes each associated with an elastic pressure member, each of the brushes and the respective elastic member being displaceable between a standby position, prior to the complete assemblage of the motor, in which the brush is separated from the commutator, and a working position, in which the brush, via a contact face, bears on the commutator, and the elastic member exerts a radial force on a supporting face of the brush, the supporting face being opposite to the contact face tending to press said brush onto the commutator, wherein the end flange includes a projecting member corresponding to each of said pair of brushes, adapted so as to bear on the brush and displace the brush and the respective elastic member from the standby position to the working position when assembling the end flange onto the shell, assembly of the flange onto the shell is carried out by at least one axial relative motion, and the projecting member is an axial finger having a ramp intended to bear on an edge of the corresponding brush, and adapted so that the axial motion of assembling the flange causes a radial motion of the brush to said working position, and the elastic member is a spiral spring including an end arm which, in said standby position, is axially disengaged from the supporting face and axially prestressed, so as to move axially into said working position upon radial displacement of the brush.

9. The drive device according to claim 8, wherein the flange is fixed onto the shell by a bayonet device.

10. The drive device according to claim 8, wherein assembly of the flange onto the shell is carried out by at least one rotary relative motion, and the projecting member is an axial finger having a ramp intended to bear on an edge of the corresponding brush, and adapted so that the rotary motion of assembling the flange causes a radial motion of the brush to said working position.

11. The drive device according to claim 10, wherein the flange is fixed onto the shell by a bayonet device.

12. The drive device according to claim 8, wherein the end arm bears, in the standby position, on a substantially radial face of the brush.

13. The drive device according to claim 8, wherein the brush comprises a notch on said supporting face, said notch being adapted to be engaged by the end arm and retain said end arm, when the elastic member and the brush are in said working position.

14. The electric drive device as recited in claim 8, wherein said elastic pressure member is a spiral spring wound around a pin.

* * * * *

UNITED STATES PATENT AND TRADEMARK OFFICE
CERTIFICATE OF CORRECTION

PATENT NO.    : 6,552,465 B2
DATED         : April 22, 2003
INVENTOR(S)   : Thierry Mademba-Sy It is certified that error appears in the above-identified patent and that said Letters Patent is hereby corrected as shown below:

<u>Column 6,</u>
Line 7, "to" should be -- the --.
Line 22, "front" should be -- from --.

Signed and Sealed this

Nineteenth Day of August, 2003

JAMES E. ROGAN
*Director of the United States Patent and Trademark Office*